United States Patent [19]

Nablo et al.

[11] Patent Number: 4,844,764
[45] Date of Patent: Jul. 4, 1989

[54] PROCESS OF IN-LINE COATING AND DECORATIVE-LAYER LAMINATION WITH PANEL BOARD MATERIAL EMPLOYING ELECTRON BEAM IRRADIATION

[75] Inventors: Sam Nablo, Lexington, Mass.; Donald French, Louisville, Ky.

[73] Assignee: Energy Sciences Inc., Woburn, Mass.

[21] Appl. No.: 175,615

[22] Filed: Mar. 29, 1988

Related U.S. Application Data

[63] Continuation of Ser. No. 847,117, Apr. 3, 1986, abandoned, which is a continuation of Ser. No. 641,414, Aug. 16, 1984, abandoned, which is a continuation of Ser. No. 415,534, Sep. 7, 1982, abandoned.

[51] Int. Cl.⁴ .............................................. B32B 31/28
[52] U.S. Cl. ................. 156/275.5; 156/275.7; 156/278; 156/307.3; 156/307.7; 156/310; 427/44
[58] Field of Search ............... 156/273.5, 275.5, 275.7, 156/272.2, 305, 242, 379.8, 380.9, 278, 556, 280, 299, 243, 307.1, 307.3, 307.4, 307.7, 310; 428/326, 343, 345; 427/44

[56] References Cited

U.S. PATENT DOCUMENTS 3,702,412 7/1972 Quintal .............................. 313/299
3,745,396 10/1973 Quintal et al. ........................ 313/37
3,769,600 1/1973 Denholm et al. ..................... 328/233
4,246,297 4/1981 Nablo et al. ........................... 427/44
4,360,540 11/1982 Chong .................................. 427/44

FOREIGN PATENT DOCUMENTS 1924110 5/1971 Fed. Rep. of Germany ... 156/272.2
3010060 10/1981 Fed. Rep. of Germany ... 156/275.5

OTHER PUBLICATIONS

Helmers, R. A., Introducing New Electron Beam Cured Decorative Composite Panels, Furniture Manufacturing Management, 14, Jul. 1979.

Primary Examiner—Merrell C. Cashion, Jr.
Attorney, Agent, or Firm—Rines and Rines Shapiro and Shapiro

[57] ABSTRACT

This disclosure relates to the use of electron beam curing and bonding irradiation in an in-line process of laminating a decorative layer, such as printed paper, to an adhesive-coated particle board panel or the like, wherein an electron-curable top coating is adsorbed into the paper and, under the electron-beam irradiation, cures with the adhesive to produce a monolithically bonded paper-to-panel polymeric structure with a hard scratch and abrasion-proof surface imparted to the paper.

5 Claims, 2 Drawing Sheets

PROCESS OF IN-LINE COATING AND DECORATIVE-LAYER LAMINATION WITH PANEL BOARD MATERIAL EMPLOYING ELECTRON BEAM IRRADIATION

This is a continuation application of Ser. No. 847,117 filed Apr. 3, 1986, which is a continuation application of Ser. No. 641,414 filed Aug. 16, 1984, which is a continuation application of Ser. No. 415,534 filed Sept. 7, 1982, all of which are now abandoned.

The present invention relates to processes for laminating decorative layers, such as paper containing printed patterns, textures or the like, with panel boards and the like, being more particularly directed to providing laminated panel and decorative layer assemblies with ultimate hard, scratch and abrasion-resistant properties not originally possessed by such decorative layers while electron-beam bonding the laminate into a monolithic permanent structure.

Electron-beam radiation has been used for the curing of wood coatings and the like, as for producing enamel-coated fiberboard or chip-board for door, cabinet or other panel applications. More recently, as described, for example, by Helmers, R. A., "Introducing New Electron Beam Cured Cured Decorative Composite Panels", Furniture Manufacturing Management, 14, July 1979, printed finishing paper has been laminated with board substrate, with the laminating adhesive electron-beam cured. Such procedures have involved ultraviolet curing of adhesive on the board substrate before application of the printed finishing paper and, after lamination, the application of a top coat, followed by scanned electron-beam curing of the structure. This operation precludes "wetting" of the paper by the cured adhesive, so that the adhesive and top coat are, in effect, cured at separate times such that the structure is a laminate of connected layers with a visible top coat. Other procedures involve thermal-flash B-stage curing of the laminating adhesive (such as an emulsified polyvinyl acetate or the like) and subsequent activation by a heated roll during lamination, with the top coat-electron-beam cured. Once again, however, the laminating adhesive is unresponsive to the electron cure, with the process precluding wetting of the finishing paper by the laminating adhesive or full adhesive cure at the time of top coat curing. The resulting structure is again a laminate of connected layers, with an apparent coating upon the paper.

Underlying the present invention is the discovery that a synergistic effect can be attained by a different process wherein the paper is impregnated by the wet top coat (with appropriate dwell time) and is also further saturated by the wet laminating adhesive on the board substrate to which it is applied. The electron beam cures both top coat and adhesive simultaneously, unexpectedly producing not just a laminate of mere connected and possibly peelable layers, but a novel bonding or grafting of the paper with the board in a virtually non-separable monolithic structure that permeates the paper, renders it hard and scratch-resistant, and has little residual evidence of a well-defined top coat layer on the surface of the paper—the paper decoration (though hardened) very desirably being the exposed surface.

An object of the present invention, accordingly, is to provide a new and improved electron beam process of coating and decorative paper or other layer lamination with panel boards and the like that employs this synergistic effect to provide novel decorated panels with improved properties over earlier panels as previously discussed.

A further object is to provide such a novel process and decorated panel that are particularly adapted for in-line processing techniques.

Other and further objects will be explained hereinafter and are more particularly delineated in the appended claims.

In summary, however, from one of its broader viewpoints, the invention embraces a process of in-line coating and decorative-layer lamination with panel material and the like, that comprises, applying to a surface of said panel, a wet electron-curable adhesive layer of viscosity sufficient to provide a relatively flat outer surface; applying a liquid-permeable normally flexible and scratchable and markable decorative layer upon the said adhesive layer outer surface; applying wet electron-curable low viscosity liquid lacquer and the like as a top coating to the upper surface of the decorative layer; permitting sufficient dwell time of said top coating upon said decorative layer to enable the top coating to permeate into said decorative layer down to contact the said outer surface of said adhesive layer, fully impregnating the decorative layer with substantially no or minimal top coating remaining above said decorative layer; and thereafter directing electron-beam irradiation upon said decorative layer with sufficient energy and dose to polymerize the wet lacquer permeated through the decorative layer and its contact with the outer surface of the wet adhesive, converting the decorative layer into a hardened and stiff polymer film resistant to scratching and marking and impact and bonded into a monolithic permanent structure with said panel. Preferred and best mode panel constructions and details are hereinafter presented.

The invention will now be described in connection with the accompanying drawings.

While various types of electron beam processors may be used in the process of the invention, including the before-mentioned scanning types, it is preferred to employ linear beam irradiation generators as of the type described in the prior U.S. Pat. Nos. 3,702,412, 3,745,396 and 3,769,600 of the assignee (Energy Sciences Inc.) of the present invention, including its CB 200/140/90 "Electrocurtain" processor. The use of such apparatus in electron-beam curing for adhering layers to textiles and other surfaces passed along production lines is described, for example, in U.S. Pat. No. 4,246,297.

In accordance with the present invention such or similar apparatus may be used in this new process for the continuous curing of large area panel products. For illustrative purposes, particularly since it involves the important area of building products and the like, the sheet-feeding of particle board or similar panel substrates to be laminated with printed paper or plastic decorative layers that in turn are to be top coated or otherwise provided with a protective exterior facing, will be specifically discussed.

Figure 1:
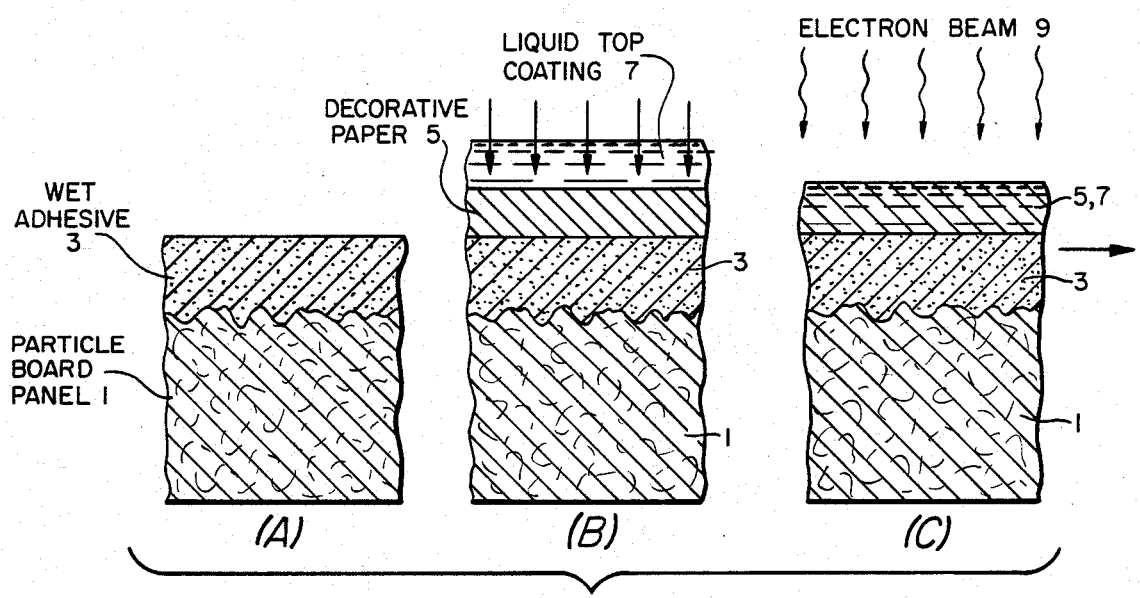
FIG. 1 illustrates three steps A, B and C in the practice of the invention.

Preparatory to such lamination and the electron-beam curing, in this example, the raw panel will usually first be sanded and cleaned. Then, as shown in FIG. 1(A), a wet electron-curable adhesive layer 3, of viscosity thin enough to flow into the panel fibres, as shown, but thick enough to provide a relatively stable flat and uniform outer surface, is applied to the surface (upper) of the panel 1 to be decorated, as by conventional means such as, for example, a reverse roll coater or the like (not shown) or as described in said U.S. Pat. No. 4,246,297. A printed or otherwise decorated or finished paper layer 5 or the like, FIG. 1(B), normally flexible and scratchable or markable and preferably somewhat porous or otherwise substantially liquid permeable, is shown applied to the adhesive layer 3 that coats the board 1. In practice, after lamination of the printed paper 5 (as from a conventional overhead unwind, not shown) to the adhesive coated board, the paper may be slit so that the panels are separated.

A liquid electron-curable top coating 7, such as a low viscosity liquid lacquer and the like, is then applied to the paper layer 5, typically with a curtain coater in a conveyor section offering high differential transport speed, schematically represented by the arrows, to insure, in accordance with the invention, sufficient dwell time before reaching the electron beam section 9 [FIG. 1(C)] that the top coating will permeate into and through the paper layer 5 down into contact with the adhesive layer 3, which also will permeate into the paper layer 5 from below. It is preferred that the top coating have time fully to impregnate the paper layer 5; the dwell time being adjusted to be sufficient for the top coating to be absorbed substantially totally within the paper layer 5, as laminated to the adhesive coating 3, such that there is no residual visible (or minimal) top coating remaining above the paper layer 5.

For certain applications, it may be desirable to retain a residual topcoat, for example, for functional purposes such as surface texturing or abrasion resistance, which can be readily accomplished by adjustment of the application thickness and viscosity, and of the coating dwell time to limit impregnation of the paper.

At such time, the laminate reaches the electron beam station 9 of FIG. 1(C), conveyed along the line of the horizontal arrow, for simultaneous curing of the top coating and adhesive materials permeating the paper layer 5, and effecting the novel bonding or grafting to the particle board 1 in the previously described monolithic, unitary structure, while converting the paper layer 5 into a hardened, stiff polymer film which, unlike the original paper, is resistant to scratching, marking and impact. The synergistic merging of the coating and adhesive materials within the paper layer (and upper part of the board) into this unexpected monolithic structure is clearly shown in the photomicrograph of FIG. 3 (200 X) demonstrating superb wetting and integration of the coated paper-particle board system (100 gm/m² construction).

Figure 3:
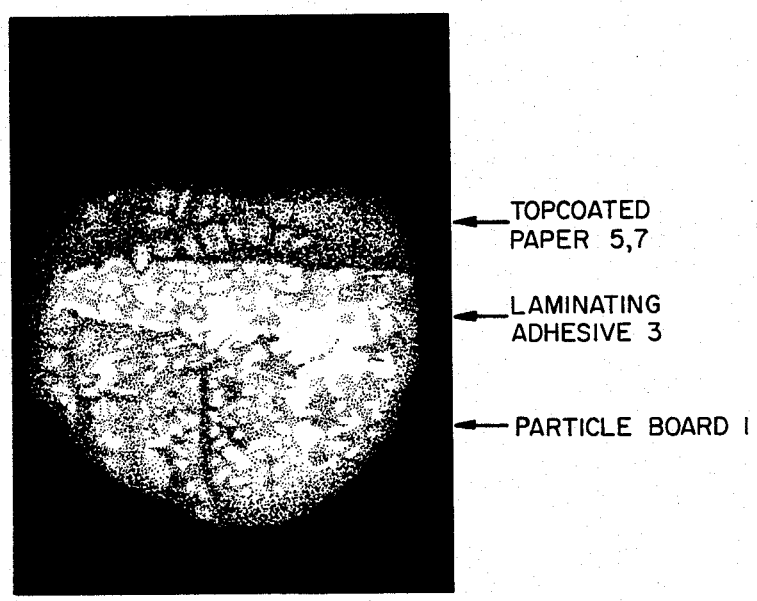
FIG. 3 is a photomicrograph of a top coated paper-decorated laminated particle board (200 X) illustrating the monolithic structure bonding or grafting effect produced by the invention.

A typical board construction, such as that of FIG. 3, involves about 50 gm/m² of top coat 7 on about 30 gm/m² of printed paper 5, with up to about 70 gm/m² of adhesive 3. As a consequence, uniform curing through at least 150 gm/m² of matter is required. (This can easily increase to 250 gm/m² if printed vinyl is used in place of paper-in this case 100 micron thick vinyl (130 gm/m²) may be typically employed). Suitable top coats 7 are of acrylic, epoxy or urethane; papers, rice paper or nitro celluose-based paper; adhesives, of acrylic, epoxy or urethane. The dwell time for rice paper (30 gm/m²) and a top coat of acrylic lacquer (50 gm/m²) may be about ten seconds. Typical wood particle boards 1 are in the range of 0.3 to 3 cm. thick; top-coated layers of the order of 50–100 microns; and laminating adhesives of the order of 20–50 microns.

Figure 2:
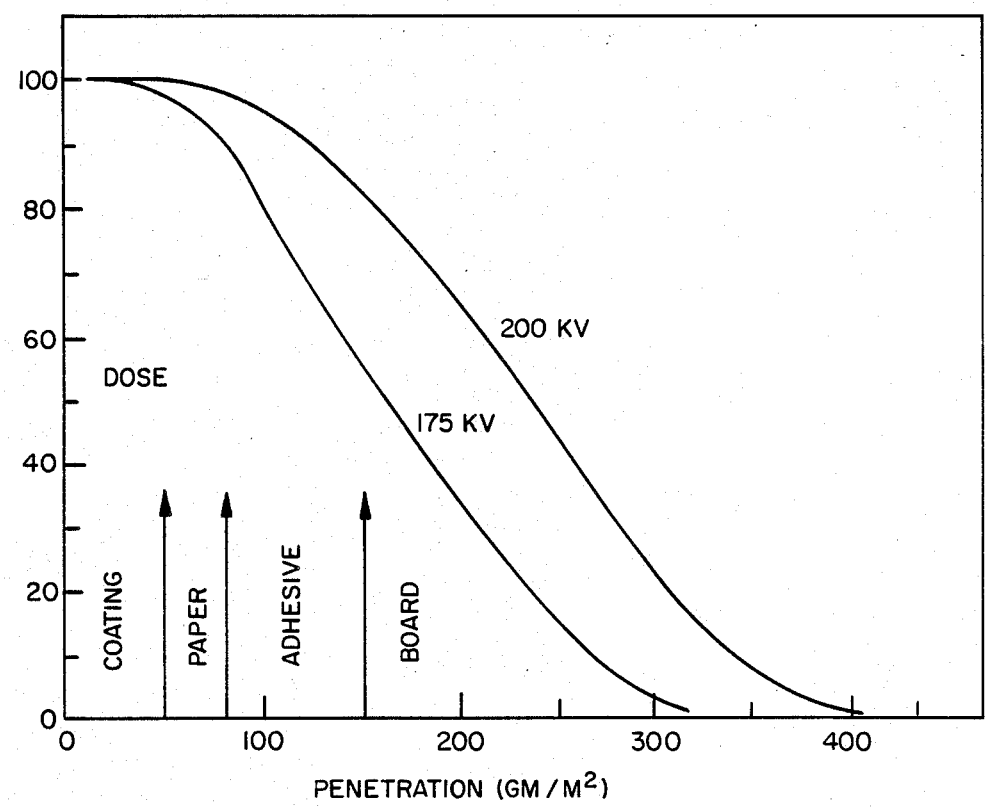
FIG. 2 is a graph illustrating electron-beam penetration into the various layers as a function of dose.

The penetrating capability of the electron processor 9 is important, particularly for the laminating application, as it is essential that the construction be cured uniformly and simultaneously to eliminate any possibility of film stress or creep due to inadequate cure. FIG. 2 shows the measured penetration performance of the above-described board construction at electron beam operating voltages of 175 and 200 kilovolts. The curves indicate that the half-points of the energy or treatment profile in the product are 170 and 250 gm/m² respectively at these operating levels; i.e. 0.007 inch and 0.010 inch for material of unit density. Operation at voltages of up to 225 kV (300 gm/m² or 0.012 inch) will provide a reasonable margin of safety for "thick" lamination applications, and for line speeds of from about 75–200 feet per minute (up to say 60 meters/minute). The before-mentioned linear beam processor can provide a ±10% beam uniformity over a width of 1.35 meters (53 inches) at the plane of product curing, with a flat (half-width of 5 cm at the product plane,) uniform, low dose rate treatment zone (about 2 to 4 megarads) that enables insurance of completion of the polymerization of the coatings and adhesives. Efficient inerting of the process zone and effective ventilation of the curing station are readily attainable with this type of equipment.

Typical panel dimensions at 1.2×2.5 meters (4 feet×8 feet) and the before-mentioned CB product-handling linear electron beam processor used in-line to convey the panel products continuously through the electron curing station 9 is 12.4 m×1.56 m×1.67 m (40 feet×5 feet×5.5 feet), designed, as before stated, for use at speeds up to 60 meters/minute (200 fpm).

The line process described herein produces a fully "radiation cured" laminate which is favorably comparable in other respects, also to the conventional (0.75 mm thick) high pressure laminates of the prior art. Tests conducted on Pittsburgh Plate Glass Coatings R109W66 (a solid white pigmented coating typically used on filled board) and R81N66 (a clear topcoat for woodgrain printed paper laminated), showed Hoffman Scratch ratings of 1800 and 1100, respectively, compared with 400 for such high pressure laminates.

As previously stated, thin plastic layers may also be used, though such will vary in terms of the degree of top coating permeation that can be effected. Similarly other panel structures than board materials may be employed, again obtaining at least some of the advantages of the invention if not all of the features. Further modifications will also occur to those skilled in this art, such being deemed to fall within the spirit and scope of the invention as defined in the appended claims.

What is claimed is:

1. A process of in-line coating and decorative-layer lamination with panel material that comprises: applying to a surface of said panel, a wet electron-curable adhesive layer of quantity and of viscosity sufficient to provide a substantially flat outer surface; applying to the outer surface of said adhesive layer a decorative paper layer that is liquid-permeable and normally flexible, scratchable and markable; applying wet electron-curable low viscosity liquid lacquer and the like as a top coating to the upper surface of the decorative layer; permitting sufficient dwell time of said decorative layer upon said adhesive layer and of said top coating upon decorative layer to enable the adhesive layer to permeate up into said decorative layer and to enable the top coating to permeate down into said decorative layer to contact the said adhesive layer, fully impregnating the decorative layer with said adhesive and said lacquer with substantially no top coating remaining above said decorative layer; and thereafter directing electron-beam irradiation upon said decorative layer with sufficient energy and dose to polymerize the wet lacquer permeated through the decorative layer and its contact with the wet adhesive, the electron-beam irradiation being adjusted to produce doses of substantially 2 to 4 megarads at an operating voltage within the range of substantially 175-250 KV and at line speeds of the panel, top coating, and adhesive under said electron-beam irradiation of from substantially 75 to 200 feet per minute so that the electron beam irradiation is sufficient to cure the top coating and the adhesive uniformly and simultaneously, converting the decorative layer into a hardened and stiff polymer film resistant to scratching and marking and impact and bonded into a monolithic permanent structure with said panel.

2. A process as claimed in claim 1 and in which said panel material is of fibrous and particulate material and said adhesive layer flows into the surface of said material.

3. A process as claimed in claim 1 and in which said panel is formed of wood fibers or particles.

4. A process as claimed in claim 1 and in which the process is performed so that the panel has a thickness in the range of 0.3 to 3 cm, the cured top coated decorative layer has a thickness of the order of 50–100 microns, and the cured adhesive layer has a thickness of the order of 20–50 microns.

5. A process as claimed in claim 1 and in which the process is performed so that about 50 gm/m$^2$ of top coating and about 70 gm/m$^2$ of adhesive are applied to about 30 gm/m$^2$ of decorative paper.

* * * * *